United States Patent Office

2,916,499
Patented Dec. 8, 1959

2,916,499

PROCESS FOR PRODUCING AROMATIC CARBONYL COMPOUNDS AND PEROXIDE COMPOUNDS

Edgar A. Blair, Drexel Hill, Pa., assignor to The Welsbach Corporation, Philadelphia, Pa., a corporation of Delaware No Drawing. Application October 28, 1957
Serial No. 692,521

6 Claims. (Cl. 260—340.5)

This invention relates to processes for the preparation of carbonyl and peroxide compounds and more particularly to such processes in which these compounds are obtained by the reaction of compounds containing ethylenic groups with ozone.

Heretofore processes have been proposed in which aromatic oils have been ozonized to produce, among others, vanillin, heliotropin and anisic aldehyde. These known processes require a reduction step with an inorganic reducing agent either simultaneously with or subsequent to the ozonization step.

In present commercial processes to obtain these products chromic acid or some related compound is used in an oxidation step and the chrome salts must then be separated and recovered from the product. The reaction must be carried out in a dilute solution to prevent further oxidation of the aldehydes and the conversion must be kept low to obtain optimum yields. Such processes are known in the patent art and are described in articles in the literature relating to the production of various aldehydes by ozonolysis of olefins but yields of less than 75% are reported and all of these processes require a reduction step.

Most unexpectedly I have found that if isoeugenol acetate, isosafrole, anethole, or alpha-methyl styrene are ozonated in the presence of a low molecular weight hydroxylic compound such as acetic acid or methanol and the reaction product then fractionally extracted with water and an immiscible organic solvent, that the water extract contains substantially all of the active oxygen and the solvent extract contains nearly the theoretical amount of aromatic carbonyl compound. This process requires no reduction step and yields are unexpectedly high.

Compounds containing ethylenic groups suitable for use in the present processes are of the type

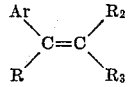

where the substituents on the left side of the double bond are described under the carbonyl compound and the substituents on the right side of the double bond are described by the carbonyl constituent of the peroxide compound.

The carbonyl compounds produced by the present processes are of the type

where Ar is an aromatic radical and R is hydrogen or an aliphatic radical. The peroxide compounds are of the type formed by the combination of hydrogen peroxide, a low molecular weight hydroxylic compound and a carbonyl compound with the carbonyl carbon holding either hydrogen or an alkyl group.

It is therefore an object of the present invention to provide novel processes for producing aromatic aldehydes and ketones from compounds containing ethylenic groups using ozone as an oxidizing agent in a more economical procedure than heretofore known.

Another object is to produce such carbonyl compounds in higher yield than has heretofore been possible.

Another object is to produce such aldehydes free from inorganic impurities.

Another object is to produce such carbonyl compounds by ozonolysis of compounds containing ethylenic groups without the employment of a reduction step.

Another object is to provide such processes for producing peroxide compounds which cannot be produced commercially at the present time.

Other and further objects of the present invention will appear from the following description of illustrative procedures in accordance therewith.

The carbonyl compounds produced by the processes of the present invention are known articles of commerce and the peroxide compounds can be used in place of hydrogen peroxide in most of the oxidation procedures in which hydrogen peroxide is used. Vanillin and anisic aldehydes as produced by the processes of the present invention are widely used in the food and beverage industry as flavoring compositions and anisic aldehyde is used as a perfume ingredient. Heliotropin or piperonal is commercially used as an ingredient of perfumes and also in the preparation of insecticides while acetophenone not only is used in the manufacture of perfumes but is also useful as a drug intermediate and is used in the resin and solvent industries.

As pointed out above, I have found most unexpectedly that when certain compounds containing ethylenic groups are reacted with ozone in the presence of a low molecular weight hydroxylic compound and the reaction product then extracted with water and an immiscible organic solvent, an excellent yield of carbonyl compound is obtained in the solvent and an excellent yield of active oxygen is found in the water extract. This unexpected result is not obtained if olefins such as styrene, vinyl toluene or methyl isopropenyl ketone are ozonated in the presence of acetic acid or methanol and the reaction product then fractionally extracted wtih water and ether. In these cases fifteen percent of active oxygen is found in the water extract and 85% of active oxygen is found in the organic extract, and very little free aldehyde or ketone can be found.

However when the same process is carried out with isoeugenol acetate, isosafrole, anethole, or alpha-methyl styrene the unexpected results referred to above are obtained and the water extract contains substantially all the active oxygen and the solvent extract contains nearly the theoretical amount of aromatic carbonyl compound.

The low molecular weight hydroxylic compounds that may be employed in the present processes include but are not limited to acetic acid and methanol and the immiscible organic solvent which may be employed in the present processes may be but is not limited to ether, benzene or petroleum ether.

In accordance with an illustrative embodiment of the processes of the present invention, 5.00 g. alpha-methyl styrene and 5.0 ml. H$_2$O are ozonated in the presence of 40 ml. acetic acid for 37 minutes at the rate of 50 mg. ozone per minute. At the end of this period the ozone passes through the reactor unabsorbed. The reactor is cooled with an ice bath so that the temperature of the reaction remains at 8° C. during the addition of ozone. The reaction product is then fractionally extracted by the method described by Bush-Denson, Anal. Chem. 20, 121–9 (1948), using four stages with 100 ml. fractions of both water and ether. The eight resulting fractions are then analyzed for carbonyl content by the method described in Sizzia, "Quantitative Organic Analysis Via Functional Groups," 1954, Wiley, page 28. The fractions are analyzed iodometrically for peroxide. The ether fractions are found to contain 4.62 g. carbonyl compound, calculated as acetophenone and the water fractions are found to contain active oxygen equal to 1.65 g. $O_3$, the yields being 91% and 81% respectively.

In another example of the processes of the present invention, 5.0 g. isoeugenol acetate are ozonated and the reaction product fractionally extracted as described above. The theoretical amount of ozone is employed and is absorbed. The ether extract is found to contain 4.64 g. of carbonyl compound calculated as vanillin acetate, which is 98% of theoretical, and in the water extract is found 1.04 g. of active oxygen as $O_3$, which is 90% of theoretical.

In a third example of processes in accordance with the present invention, 5.0 g. anethole are ozonated and fractionally extracted as in the first example. The ether extract is found to contain 4.25 g. of carbonyl compound calculated as anisic aldehyde, which is 93% of theoretical, and the water extract is found to contain 1.38 g. active oxygen as $O_3$, which is 85% of theoretical.

In another example of the present processes, 5.0 g. isosafrole are ozonated and fractionally extracted as described above. The ether extract is found to contain 4.34 g. of carbonyl compound calculated as piperonal, which is 94% of theoretical, the water extract is found to contain 1.11 g. active oxygen as $O_3$ which is 75% of theoretical.

In another example, 5.0 g. isoeugenol acetate are ozonated in 45 ml. methanol in a water bath to hold the reaction temperature to 30° C. The theoretical amount of ozone is reacted therewith and absorbed and the reaction product is shaken in a separation funnel with 100 ml. benzene and 100 ml. water. The two phases are each washed twice with the other phase and the washing combined with the extracts. The benzene upon analysis is found to contain 4.58 g. of carbonyl compound calculated as vanillin acetate, which is 97% of theoretical and the water extract is found to contain 1.10 g. active oxygen calculated as ozone, which is 95% of theoretical.

It should now be apparent to those skilled in the art that the processes of the present invention in every way satisfy the several objectives described above.

Changes in or modifications to the above described illustrative procedure may now be suggested without departing from the present inventive concept. Reference should therefore be had to the appended claims to determine the scope of this invention.

What is claimed is:

1. In a process for preparing both carbonyl compounds and peroxide compounds from compounds containing ethylenic groups the combination of the step of reacting a compound containing ethylenic groups selected from the group consisting of alpha-methyl styrene, isoeugenol acetate, anethole and isosafrole with ozone in the presence of a material selected from the group consisting of acetic acid and methanol, then fractionally extracting the reaction product with water and an immiscible organic solvent selected from the group consisting of ether, benzene and petroleum ether, and then recovering the carbonyl compound from the organic solvent and recovering the peroxide compound from the water.

2. A process as described in claim 1 in which the olefin is alpha-methyl styrene and the carbonyl compound is acetophenone in yields approximately 91% of theoretical.

3. A process as described in claim 1 in which the olefin is isoeugenol acetate and the carbonyl compound is vanillin acetate in yields approximating 98% of theoretical.

4. A process as described in claim 1 in which the olefin is anethole and the carbonyl compound is anisic aldehyde in yields approximating 93% of theoretical.

5. A process as described in claim 1 in which the olefin is isosafrole and the carbonyl compound is piperonal in yields approximating 94% of theoretical.

6. A process as described in claim 1 in which the olefin is isoeugenol acetate, the low molecular weight hydroxylic compound is methanol, the immiscible organic solvent is benzene and the carbonyl compound is vanillin acetate in yields approximating 97% of theoretical.

References Cited in the file of this patent

UNITED STATES PATENTS

| | | |
|---|---|---|
| 553,039 | Otto et al. | Jan. 14, 1896 |
| 2,776,986 | Sanderson | Jan. 8, 1957 |
| 2,781,401 | Jacobsen | Feb. 12, 1957 |

OTHER REFERENCES

Otto: Annales de Chimie et de Physique, 7$^E$ Ser., vol. 13, pp. 120–217 (1898).

Houben: Die Methodere der Org. Chem., vol. 3, pp. 406–408, 3rd ed., Edwards Brothers, Ann Arbor, Michigan, 1943.